Patented June 15, 1954

2,681,347

UNITED STATES PATENT OFFICE 2,681,347

PREPARATION OF LEUCO METAL PHTHALOCYANINES

Charles John Pedersen, Salem, N. J., assignor to E. I. du Pont de Nemours and Company, Wilmington, Del., a corporation of Delaware No Drawing. Application March 26, 1952, Serial No. 278,745

6 Claims. (Cl. 260—314.5)

This invention relates to solvent-soluble leuco derivatives of certain metal-phthalocyanines. It is an object of this invention to provide a novel and improved process for preparing compounds of the aforementioned classes. Various other objects and achievements of this invention will appear as the description proceeds.

In my copending application, Serial No. 252,188, filed October 19, 1951, now Patent No. 2,662,896, is described a process for producing compounds of the aforegoing classes, which comprises treating the corresponding metal-phthalocyanine, say the phthalocyanines of iron, cobalt, nickel or copper with chlorine or bromine in an alcoholic medium.

The intermediate, reversible oxidation products thus obtained have different solubility characteristics than the generally insoluble parent materials. They have none of the pigment properties of the initial material, having exchanged the characteristic intense reddish-blue to greenish-blue color of the phthalocyanine pigment for an unstable violet color in some cases, or a reddish brown color in others. But unlike the end products of degradative oxidation, the intermediate oxidation stages have the remarkable property of regenerating the original color upon being treated with reducing agents or upon heating. Because of this property, the novel compounds in said application have been named leuco phthalocyanines. Both the products and the aforementioned process of making them are claimed in said application.

I have now found that reversible, solvent-soluble oxidation products of copper and nickel phthalocyanines, which are similar in properties to the corresponding leuco metal phthalocyanines of said copending application, and which very likely have similar structures, are obtained by reacting upon metal-free phthalocyanines with a halogen, such as chlorine or bromine, in an alcoholic medium which contains further a salt of the desired metal, that is, a salt of copper or nickel.

As for the anionic portion of the salt, it makes no difference, as long as the salt is soluble in the particular alcoholic medium selected. The latter will generally be methyl or ethyl alcohol, ethylene glycol or a lower alkyl ether of ethylene glycol. Accordingly, suitable salts are the chlorides, sulfates, nitrates and acetates of the mentioned metals.

The quantity of salt is preferably selected in essentially stoichiometric proportion, with an excess up to 15%, based on the quantity of metal-free phthalocyanine employed. Insufficient quantities of the salt will result in incomplete conversion. Excessive quantities of the metal salt produce no harm. The halogen likewise is fed in at a rate to provide a quantity of halogen corresponding to between 1.0 and 1.15 moles of the halogen per mole of metal-free phthalocyanine being treated. Where, however, the copper salt employed is in cuprous state, an extra quantity of halogen may be used, and is in fact preferred, so as to convert the salt to the cupric state in situ and still leave from 1.0 to 1.15 moles of chlorine or bromine, to react with the color. The correct quantity then is from 1.5 to 1.65 moles of halogen per mole of metal-free phthalocyanine being treated. Quantities of halogen in excess of those indicated above are to be avoided, inasmuch as they may result in degradative oxidation of the color, thus reducing the yield and purity of the product.

Reaction may be effected at temperatures in the range of 0 to 50° C., and preferably at 20° to 30° C. Reaction temperatures below 0° C. are undesirable because they slow down the reaction, while temperatures above 50° C. may encourage degradative oxidation of the color.

The desired reaction product may be recovered by methods similar to those indicated in my earlier application above identified, for instance by diluting the reaction mass with water and filtering off the precipitated leuco-compound.

The latter may then be applied to textiles by dyeing or printing processes, as explained more fully in my earlier application above referred to.

Without limiting my invention, the following examples are given to illustrate my preferred mode of operation. Parts mentioned are by weight.

*Example 1*

25 parts of finely divided metal-free phthalocyanines were suspended in 500 parts of anhydrous methanol containing 7.5 parts of anhydrous cupric chloride. The mixture was agitated at room temperature and 7.8 parts of chlorine were passed in over 5 minutes. The mass was then filtered and the filtrate was poured into 500 parts of water containing 50 parts of sodium carbonate. A finely-divided yellow solid was obtained which was separated by filtration, washed with water and dried under vacuum. By reduction with 22 parts of ascorbic acid in boiling methanol, copper phthalocyanine in alpha form and of a high order of purity was obtained. (Alpha, is the crystalline form of copper phthalocyanine when obtained by acid pasting.)

When an equal molar amount of nickel chloride was substituted for the cupric chloride in the above procedure, a product was obtained, which upon reduction gave nickel phthalocyanine.

*Example 2*

5 parts of finely-divided metal-free phthalocyanine were suspended in 100 parts of anhydrous methanol containing 1.5 parts of anhydrous cupric chloride, and 2.2 parts of bromine dissolved in 10 parts of anhydrous methanol were added with agitation. After 15 minutes the reaction mixture was filtered and the filtrate was poured into 100 parts of water containing 10 parts of sodium carbonate. A yellow solid was obtained which was separated by filtration, washed with water and dried under vacuum. Upon reduction of this solid with ascorbic acid in boiling methanol, copper phthalocyanine was obtained.

When the same procedure was repeated except for replacing the metal-free phthalocyanine by monochloro-metal-free-phthalocyanine or by sulfonated metal-free-phthalocyanine, leuco oxidation products were obtained which upon reduction gave the corresponding substituted copper phthalocyanines.

*Example 3*

Three and one-third parts of finely-divided metal-free-phthalocyanine were suspended in 42 parts of anhydrous methanol containing 1 part of anhydrous cupric chloride. A solution of 1 part of liquid chlorine in 10.5 parts of anhydrous methanol was added and the mixture was stirred for 10 minutes at 25° C. It was then saturated with gaseous ethylene to remove unreacted chlorine and filtered to recover 0.24 part of unchanged metal-free-phthalocyanine. The filtrate was reduced with 2.5 parts of ascorbic acid at the boiling point to yield copper phthalocyanine.

When the above procedure was modified by operating at 0° C., essentially the same results were obtained, except that the yields were lower.

When the above procedure was modified by operating at 40° C., the yield of copper phthalocyanine was much better than when operating at 0° C., but not quite so high as at 25° C.

It will be understood that the details of procedure may be varied within wide limits. Thus, in any of the examples above, the chloride of nickel or copper may be replaced by any copper or nickel salt, provided that it is soluble in the respective alcoholic medium employed. Cuprous salts may be used provided larger quantities of chlorine or bromine are fed in as already indicated. In lieu of methanol, ethanol, ethylene glycol, or the monomethyl, monoethyl ether of the latter may be used.

I claim as my invention:

1. The process of producing a reversible, leuco derivative of a metal phthalocyanine from the group consisting of copper phthalocyanine and nickel phthalocyanine, which comprises reacting with halogen and an alcohol-soluble salt of the corresponding metal upon metal-free phthalocyanine in a liquid, saturated aliphatic alcohol at a temperature between 0° and 50° C., the quantity of halogen employed for the reaction being between 1.0 and 1.15 moles per mole of metal-free phthalocyanine employed plus any additional quantity required to convert any cuprous salts present to the cupric stage, and recovering the resulting alcohol-soluble compound.

2. A process as in claim 1, the halogen being one of the group consisting of chlorine and bromine.

3. A process as in claim 2, the alcoholic medium being one of the group consisting of methanol, ethanol, ethylene glycol and the lower alkyl ethers of ethylene glycol.

4. A process as in claim 3, the salt being one of the group consisting of cupric salts and nickel salts which are soluble in the alcoholic medium selected.

5. A process of producing an intermediate, leuco, derivative of copper phthalocyanine, capable of generating copper phthalocyanine upon treatment with reducing agents, which comprises reacting upon metal-free phthalocyanine with a halogen of the group consisting of chlorine and bromine in the presence of methyl alcohol, and in the further presence of a cupric salt selected from the group consisting of cupric chloride, sulfate, nitrate and acetate, the quantity of halogen employed for the reaction being between 1.0 and 1.15 moles per mole of metal-free phthalocyanine employed, and the reaction being effected at a temperature of about 20° to 30° C.

6. A process of producing an intermediate, leuco, derivative of nickel phthalocyanine, capable of generating nickel phthalocyanine upon treatment with reducing agents, which comprises reacting upon metal-free phthalocyanine with a halogen of the group consisting of chlorine and bromine in the presence of methyl alcohol, and in the further presence of a nickel salt selected from the group consisting of nickel chloride, sulfate, nitrate and acetate, the quantity of halogen employed for the reaction being between 1.0 and 1.15 moles per mole of metal-free phthalocyanine employed, and the reaction being effected at a temperature of about 20° to 30° C.

References Cited in the file of this patent

UNITED STATES PATENTS

| Number | Name | Date |
|---|---|---|
| 2,214,469 | Linstead | Sept. 10, 1940 |